April 15, 1930.  E. F. CALLE  1,754,738

GAME

Filed April 20, 1928

Fig. 1.

| | |
|---|---|
| 1 — TRACE FROM No. 1 To No. 2 | |
| 2 — TRACE FROM No. 2 To No. 4 | |
| 3 — TRACE FROM No. 2 To No. 3 | |
| 4 — TRACE FROM No. 14 To No. 13 | |
| 5 — TRACE FROM No. 4 To No. 5 | |
| 6 — TRACE FROM No. 5 To No. 6 | |
| 7 — TRACE FROM No. 6 To No. 7 | |
| 8 — TRACE FROM No. 7 To No. 8 | |
| 9 — TRACE FROM No. 8 To No. 9 | |
| 10 — TRACE FROM No. 9 To No. 15 | |
| 11 — TRACE FROM No. 10 To No. 11 | |
| 12 — TRACE FROM No. 11 To No. 12 | |
| 13 — TRACE FROM No. 12 To No. 13 | |
| 14 — TRACE FROM No. 13 To No. 3 | |
| 15 — TRACE FROM No. 14 To No. 13 | |
| 16 — TRACE FROM No 1 To No. 3 | |
| 17 — TRACE FROM No. 1 To No. 2 | |
| 18 — TRACE FROM No. 2 To No. 4 | |
| 19 — TRACE FROM No. 2 To No. 3 | |
| 20 — TRACE FROM No. 14 To No. 13 | |
| 21 — TRACE FROM No. 4 To No. 5 | |
| 22 — TRACE FROM No. 5 To No. 6 | |
| 23 — TRACE FROM No. 6 To No. 7 | |
| 24 — TRACE FROM No. 7 To No. 8 | |
| 25 — TRACE FROM No. 8 To No. 9 | |
| 26 — TRACE FROM No. 9 To No. 15 | |
| 27 — TRACE FROM No. 10 To No. 11 | |
| 28 — TRACE FROM No. 11 To No. 12 | |
| 29 — TRACE FROM No. 12 To No. 13 | |
| 30 — TRACE FROM No. 13 To No. 3 | |

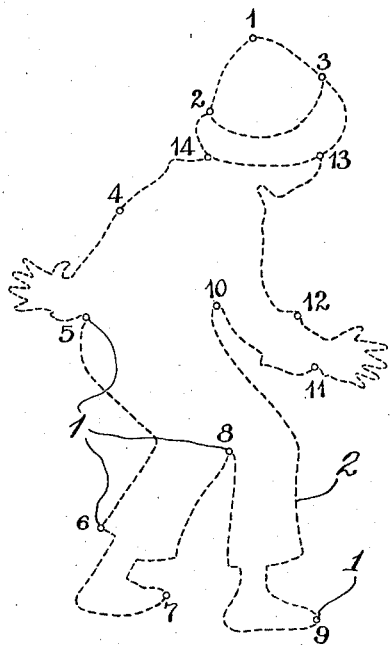

Fig. 2.

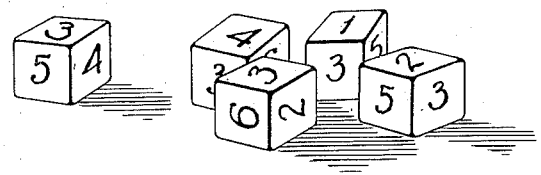

INVENTOR
EUGENE CALLE
BY
Meyers & Jones
ATTORNEY

Patented Apr. 15, 1930

1,754,738

UNITED STATES PATENT OFFICE

EUGENE F. CALLE, OF BROOKLYN, NEW YORK

GAME

Application filed April 20, 1928. Serial No. 271,524.

This invention is an improvement in games, and more particularly in a game which while amusing and entertaining is also instructive.

One of the primary objects of the invention is the provision of a game capable of being played by one or more, and wherein in addition to the amusement feature, instruction is provided in arithmetic and drawing.

With these and other objects in view the invention consists in the construction and novel combination of parts fully described hereinafter, illustrated in the accompanying drawings, and pointed out in the claims appended hereto, it being understood that various changes in the form, proportion, size and minor details of construction wherein the scope of the claims, may be resorted to without departing from the spirit of the invention.

In the drawings forming a part hereof:—

Fig. 1 is a diagrammatic view of a card of a set, having at one side a series of indications which when joined constitute the outline of a figure or the like, and a series of consecutively arranged numbers, each having in connection therewith the value of the number in indications to be connected.

Fig. 2 is a perspective view of the dice to be used in the game.

In the present embodiment of the invention a plurality of cards A is provided, each card having a series of indications 1, in the present instance, in the form of small circles, arranged in an order such that when the indications are connected by lines such as are indicated at 2, the outline of a figure will be formed, such for instance, as that shown at the right of Fig. 1.

A numeral is arranged adjacent to each indication 1, the numerals being preferably consecutive, and in the present instance running from 1 to 14. The numerals may be connected by indicated lines 2 to form the outline, or not, as may be desired, but preferably they are so connected. Each card bears a plurality of indications which when joined as indicated will outline a figure, and a table, like the indications and table shown in Fig. 1.

The indications on the several cards may be arranged to form the same figure when the indications are connected, or they may be arranged to form different figures, but in a set of cards, the indications which when connected will form the outline are the same in number on each card. Whatever the arrangement of the indications of the cards in the set, there should be the same number of indications on each card, so that all the players will have an equal chance.

The table includes at the left a series of consecutively arranged numerals, in the present instance from 1 to 30, and at the right an indication of the value of each numeral, that is, of the line to be traced when such numeral appears on the dice B to be presently described.

For instance, adjacent the numeral 1 is the legend "Trace from No. 1 to No. 2." This means that the player who obtains the number 1 on the dice, traces the line from indication 1 to indication 2. Adjacent to the numeral 2 in the table is the legend "Trace from No. 2 to No. 4," and a player turning this number on the dice will trace the corresponding line, that is, from indication 2 to indication 4.

One or more dice are used, five being shown, each having the faces thereof numbered from 1 to 6, in the usual manner by pips, or by numbers. The dice are of ordinary construction, and when more than one is used, the indications turned up by each player are added, the total sum determining the numeral in the table, which indicates what is to be done by the player making the cast.

It will be apparent that when more than one dice is used, certain numerals in the table will never be thrown. As for instance, when there are two dice, the numeral 1 cannot occur, since if aces were thrown, the sum would be 2. When 3 dice are used, the numerals 1 and 2 will not appear, and when 5 are used, the numerals 1 to 4 will not appear. The table will, of course, be arranged accordingly. That is, the series of numerals will commence with the least possible sum on the dice.

In playing the improved game, the cards of the set are distributed to the players, and each casts the dice in turn. Should, for instance, the first player turn up what is shown in Fig. 2, namely; two treys, four, deuce and ace, the total is thirteen. Consulting the table, the numeral 13 indicates that a line is to be traced from indication 12 to indication 13, and the player traces this line.

The next player then casts, and so on, until all have made a cast of the dice. The player first completing his outline is the winner. When the sum of the cast of a player is a number that has already been drawn, the cast is void, and the dice pass to the succeeding player. It will be apparent that many different methods of playing might be followed.

What is claimed as new is:—

1. A game including a series of cards, each bearing indications so arranged that when connected in predetermined sequence the outline of a figure will be formed, each indication having an identifying character, dice, and a table on each card containing the sums of possible casts of the dice and the values thereof in terms of indications to be connected.

2. A game including a series of cards each bearing identified indications so arranged that when connected in predetermined sequence in a continuous line, the outline of a figure will be formed, and a table having consecutively arranged numerals, and values thereof in terms of indications to be connected, and chance means for the selection of the table numerals.

3. A game including a series of cards, each bearing a series of consecutive numerals arranged in a predetermined relative position, such that when the numerals are connected along selected lines, the outline of a figure will be traced, and a table having a series of consecutive numerals arranged in order, and an indication of the value of each numeral in numerals of the first series to be connected, and dice for the selection of the table numerals.

4. A game including a series of cards, each bearing indications so arranged that when connected along certain lines, indicated on the card, the outline of a figure will be formed, a table for determining indications to be connected along the indicated lines, and dice for the chance selection of some one of the determinations in the table.

5. A game including a series of cards, each bearing a series of consecutive numerals arranged in predetermined relative positions, indicating lines connecting said numerals in a predetermined sequence, said indicating lines forming the outline of a figure, each card bearing a table having a series of consecutive numerals arranged in order and directions opposite each said table numeral designating two of said first named numerals to be connected along said indicating lines, and chance means for the selection of the table numerals.

Signed at New York in the county of New York and State of New York this 19th day of April, A. D. 1928.

EUGENE F. CALLE.